United States Patent [19]

Overholser

[11] Patent Number: 4,895,131
[45] Date of Patent: Jan. 23, 1990

[54] PORTABLE GAS GRIDDLE AND GRILL

[76] Inventor: James W. Overholser, 2185 Monticello Dr., Idaho Falls, Id. 83401

[21] Appl. No.: 311,357

[22] Filed: Feb. 16, 1989

[51] Int. Cl.4 .............................................. A47J 37/00
[52] U.S. Cl. ................... 126/41 R; 126/25 R; 126/276
[58] Field of Search ................ 126/25 R, 39 R, 39 H, 126/41 R, 275 R, 19 R, 40, 276, 273 R, 39 B, 27, 9 R, 268

[56] References Cited

U.S. PATENT DOCUMENTS

| 2,780,474 | 2/1957 | Farah et al. | 126/25 R |
| 3,763,846 | 10/1973 | Schantz | 126/9 R |
| 3,812,840 | 5/1974 | Whaler | 126/25 R |
| 4,553,524 | 11/1985 | Wheat et al. | 126/41 R |
| 4,635,614 | 1/1987 | Segroves | 126/41 R |
| 4,665,888 | 5/1987 | Christen, Jr. et al. | 126/25 R |
| 4,724,823 | 2/1988 | Simpson | 126/39 R |

Primary Examiner—James C. Yeung
Attorney, Agent, or Firm—Hopkins, French, Crockett, Springer & Hoopes

[57] ABSTRACT

A portable cooking unit susceptible for use with either an interchangeable griddle surface or a grill surface. The cooking unit is provided with a serving/eating portion substantially surrounding the unit, at least a portion of which may be hingedly connected to permit easy storage. A removable grill unit is provided with a hinged top for conventionally cooking when the griddle is removed. Adjustable wheels are provided for easy storage or movement of the unit.

6 Claims, 6 Drawing Sheets

PORTABLE GAS GRIDDLE AND GRILL

BACKGROUND OF THE INVENTION

This invention relates to a portable cooking griddle having a built-in serving/eating portion to enable guests to be served immediately adjacent the griddle.

Portable barbecue grills fired by pressurized hydrocarbon fuels are readily available from a wide range of manufacturers and retailers. However, such units are adapted solely for the cooking of products on a grill, defined herein as a large number of, usually, rods aligned parallel to one another and retained in their alignment by cross-members, resulting in a majority f open space through which heat from a burner element may be directed onto the food to be cooked. The cooking of many foods is impossible on such units, for it would fall into the open spaces between the grill rods. For instance, eggs, pancakes, stir-fry or Oriental dishes, etc., could not be cooked on conventional units. Conversely, conventionally-grilled food products (such as steaks) could be cooked on a griddle.

A review of the prior art indicates that there is no apparatus intended to serve the dual function of griddle/grill while providing a serving/eating unit therearound. An example of the prior art is U.S. Pat. No. 4,369,763, wherein a mobile cooking unit having a griddle plate is moved into position in the interior of a U-shaped stationary table. It is intended that the food preparer stand on the side of the griddle away from the stationary table, with the prepared food being served onto the stationary table. U.S. Pat. No. 3,794,013 discloses a portable gas grill wherein a griddle plate is secured to removable legs, and a gas burner is located beneath the griddle and affixed to a gas tank. No means are provided for affixing a grill surface above the burner, or for providing means for guests to be served around the griddle. Lastly, U.S. Pat. No. 4,730,597 discloses a portable biomass stove having an air inlet, a fuel basket and reflecting members below a grate in the bottom of the fuel basket. One or more of the stoves can be suspended in a support housing to form a multi-burner stove.

None of the aforementioned devices provides the benefits of the present invention, namely portability, conversion between either a standard grill unit or a griddle, service/eating areas totally or substantially surrounding the cooking surface and ease of manufacture.

SUMMARY OF THE INVENTION

In view of the above, it is the broad object of this invention to provide a portable gas-fired cooking unit susceptible to a plurality of uses. In particular, the apparatus may take the form of the conventional gas grill having a firebox, a flame unit and a cooking surface. The cooking surface may be provided in the form of a removable and interchangeable griddle surface and conventional grill surface, one of which would be used at a time. In the cooking of foods (such as Oriental stir-fry) the griddle surface may be utilized, wherein the cooking of conventional grilled foods (such as hamburgers or steaks) the interchangeable grill surface can be used. The apparatus is provided with a serving/eating portion, at least a portion of which can be hingedly connected to the apparatus, thereby permitting it to be lowered adjacent the apparatus when not in use.

The griddle surface is preferably sized so as to permit the escape around the periphery thereof of heat and combustion products resulting from the flame unit. The griddle may be simply lifted from the firebox and replaced with a conventional grill unit. The serving/eating portion surrounding the firebox may be constructed of any suitable material and in any suitable shape. For instance, a plurality of wood slats may be affixed adjacent one another so as to form a small "table" surrounding the firebox. One or more portions of the serving/eating portion may be hinged to the cooking unit to enable them to be folded downwardly for storage when the apparatus is not in use.

DETAILED DESCRIPTION OF THE INVENTION

Figure 1:
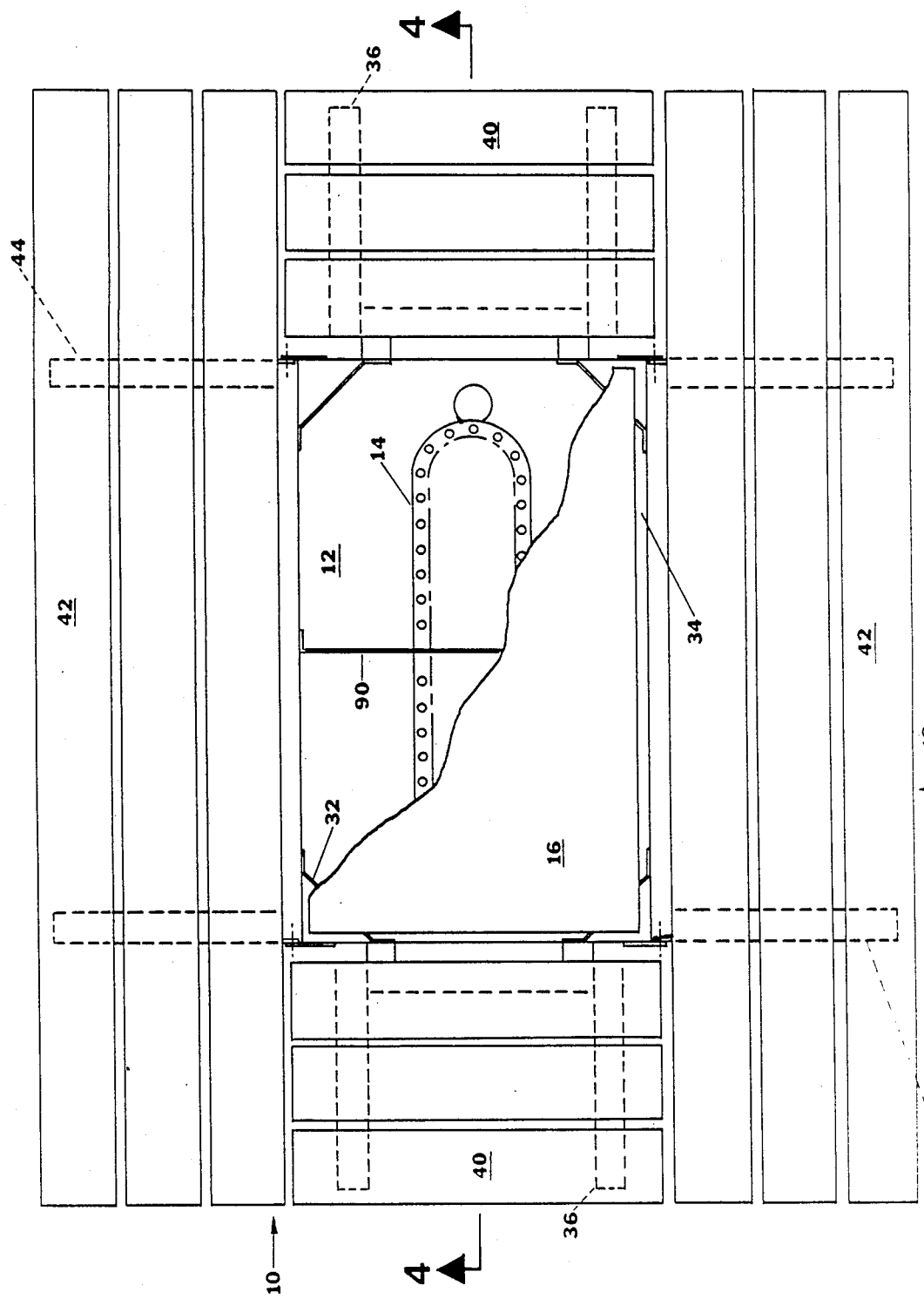
FIG. 1 is a plan view of the apparatus of the present invention.

A portable hydrocarbon gas-fired cooking unit, generally designated 10 in FIG. 1, comprises a firebox 12, a flame unit 14 and a cooking surface 16. A serving/eating portion, generally designated 18, totally surrounds the cooking surface 16.

Figure 2:
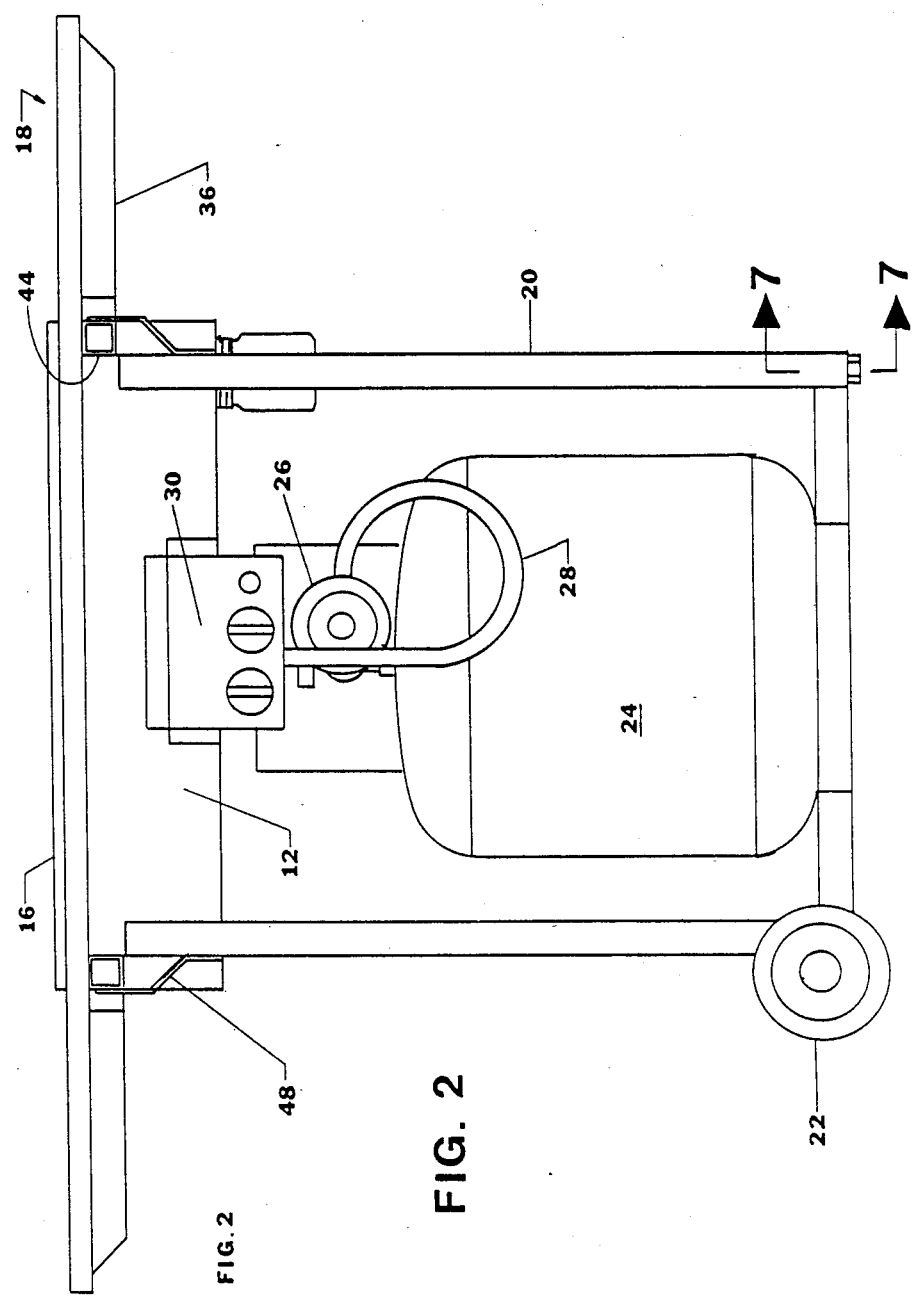
FIG. 2 is a side view of the apparatus of the present invention

The device of the present invention is advantageously provided in the form of a conventional portable cooking unit, as illustrated in FIG. 2. The firebox 12 is provided on a frame 20 provided with wheels 22. A source of cooking fuel, in the form of bottle hydrocarbon gas 24, is interconnected to the flame unit 14 by means of a regulator 26, conduit 28 and control means 30.

In a first embodiment of the present invention, the cooking surface 16 in the form of a griddle, is suspended within firebox 12, as by corner bracket members 32. The griddle 16 is preferably sized so that when placed within firebox 12, there is sufficient space 34 between the griddle and the firebox to permit the uniform escape of heat and combustion products around the periphery of the griddle 16. The flame unit 14 may have independently-operable controls permitting the flame unit to have independently-operable halves. The firebox 12 may be provided with a divider 90 which substantially divides the firebox into two halves, providing different heating regimes on the two halves when used with independently-operable controls.

The serving/eating portion 18 totally or substantially surrounds the firebox 12 and griddle 16, so that during or after preparation of food on the griddle 16, guests may be served, and may eat, at the location of food preparation. For instance, support members 36 may be securely affixed to the frame 20 and support end portions 40 of the serving/eating portion 18. Side members 42 may be supported by support members 44 which are hingedly secured to firebox 12. The members 40, 42 may be provided in any convenient form to effect the desired result of providing a service and eating area for food cooked on griddle 16. Applicant has found it advantageous to provide the members 40, 42 in the form of wood slats (or any other suitable material) secured to the supports 36, 44 as with screws or bolts. It is to be understood, however, that the particular form the serving/eating portion 18 takes is not critical; it is the provision of this surface substantially surrounding the cooking surface which is critical to the present invention.

Figure 3:
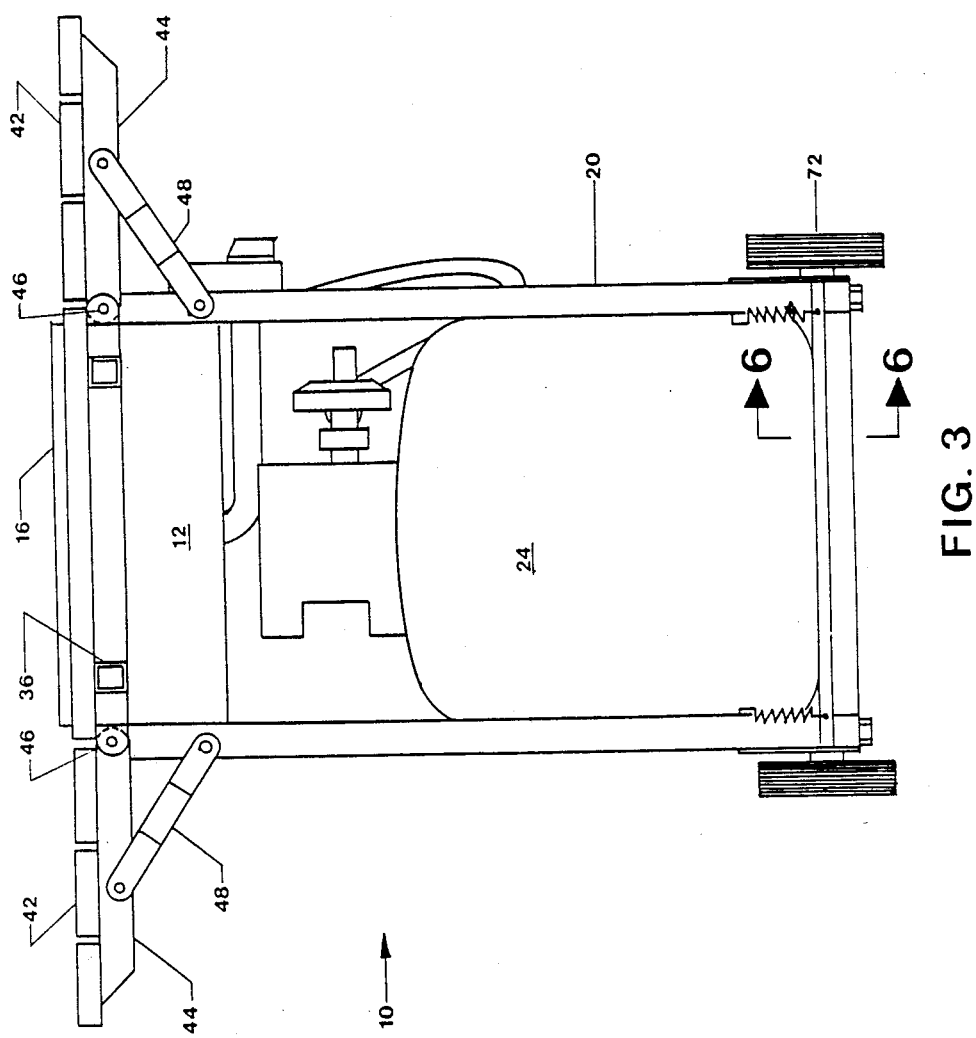
FIG. 3 is an end view of the apparatus of the present invention.

As illustrated in FIG. 3, the side members 42 may be hingedly connected, as at 46, to firebox 12 and may be provided with articulated catch members 48 insuring that the side members 42 can be securely retained in their "upright" position during use. When not need for use, the catch members 48 may be articulated and the side members 42 swung downwardly about hinge 46 to lie adjacent the vertical frame members 20, thereby easing the storage requirements of the cooking unit 10.

Figure 4:
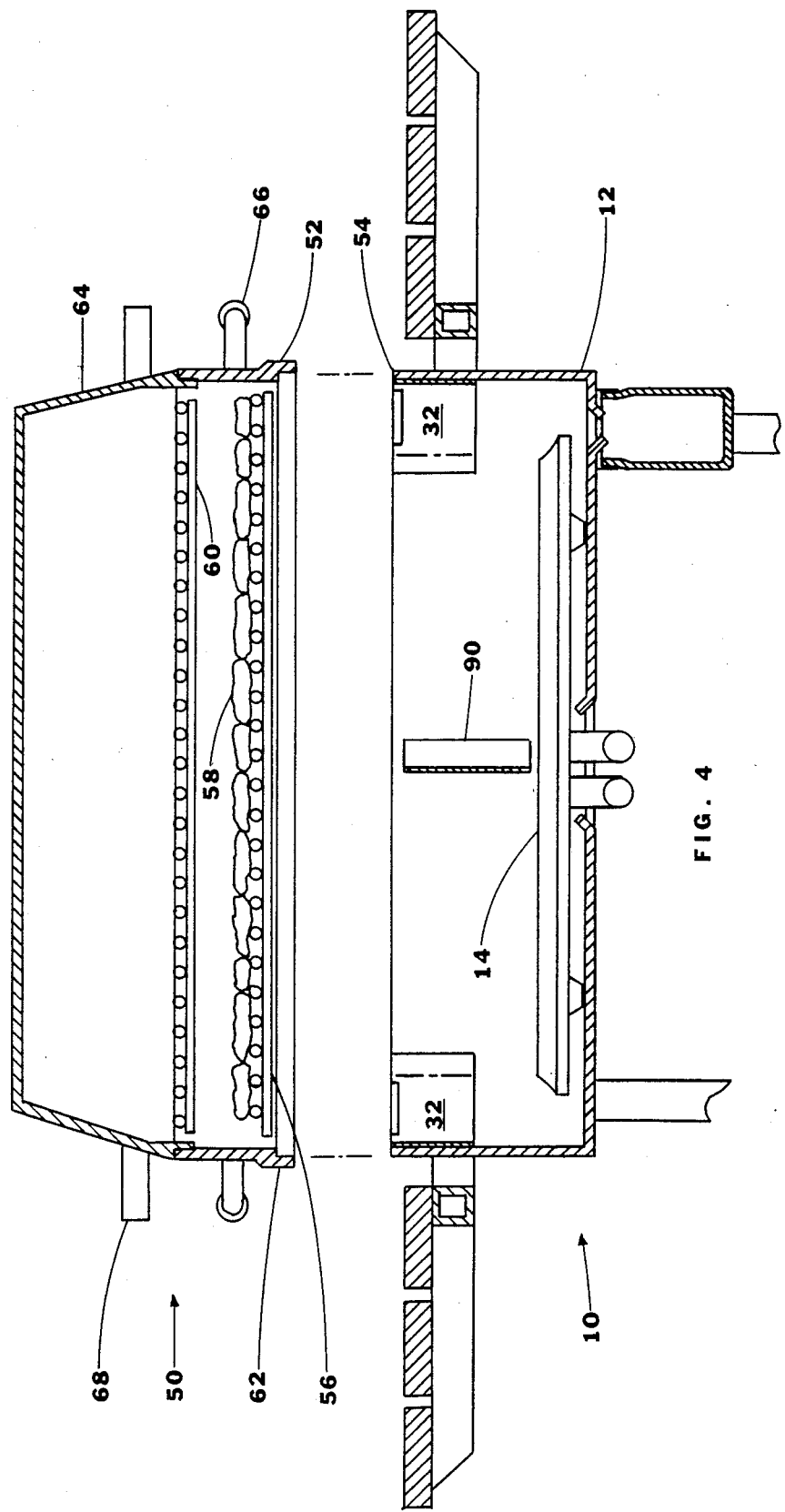
FIG. 4 is a side sectional view of the apparatus of the present invention with the removable grill unit indicated therewith.

In a second embodiment of the invention, the cooking unit 10 is provided with a removable grill unit 50 adapted to be used with the firebox 12 when the griddle has been removed. As illustrated in FIG. 4, the grill unit 50 comprises a lower lip 52 which is adapted to interfit over the upper edge 54 of firebox 12. The grill unit is provided with a false bottom 56 which supports a layer of, for instance, charcoal briquets or lava rock 58. The false bottom 56 is advantageously provided in the form of an open-weave rigid grill unit having a plurality of parallel members adhered one to another. The lava rock 58 overlies the flame unit 14 and collects drippings from food being cooked on the grill surface 60, thereby providing the conventional "grilled" taste.

The grill unit 50 comprises a lower housing portion 62, with an upper housing portion 64 hingedly connected thereto. Handles 66 are provided on the lower housing portion 62 to permit it to be easily transported to or from the cooking unit 10. Handles 68 are also provided on the upper housing 64, permitting the upper housing to be opened for access to the grill surface 60.

Figure 5:
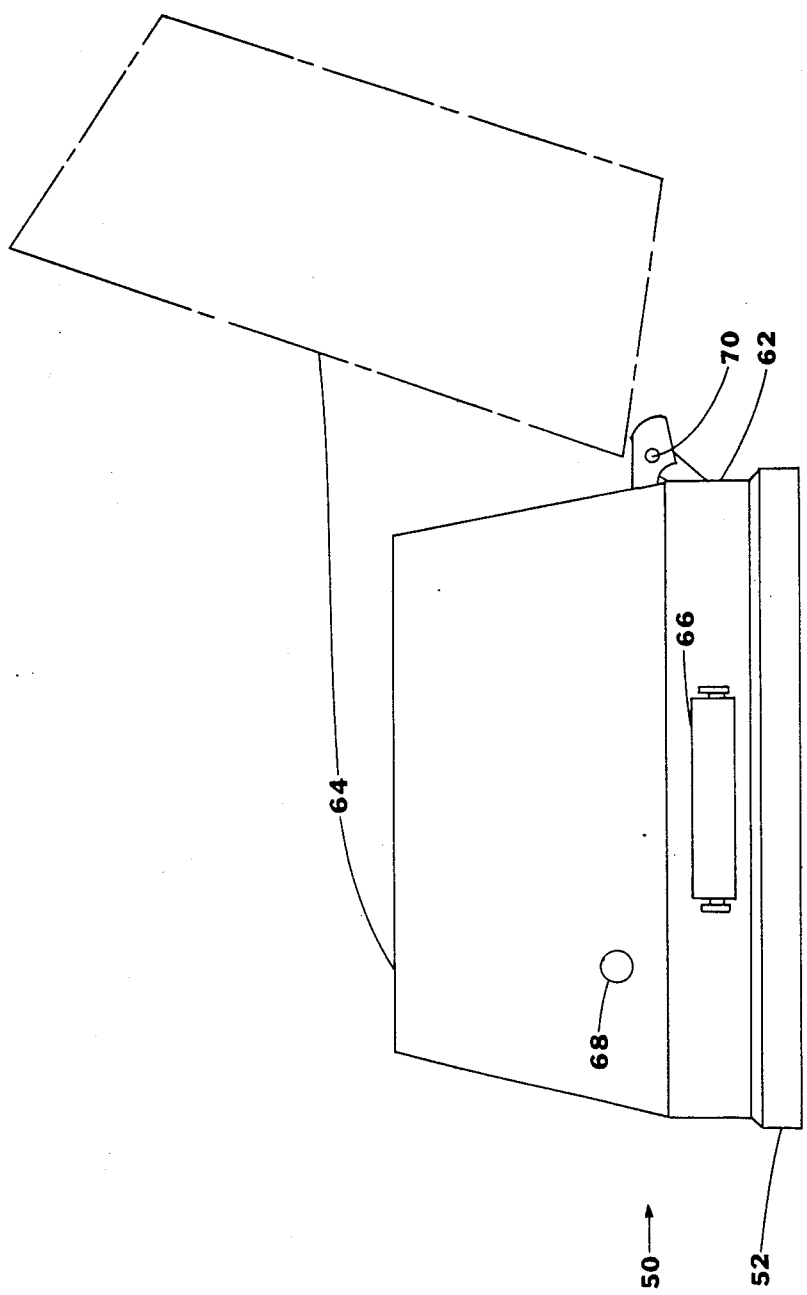
FIG. 5 is a schematic view of the removable grill unit.

As shown in FIG. 5, the grill unit 50 is provided with an upper housing 64 hingedly connected to the lower housing 62, as at 70. The upper housing 64 is preferably pivoted for access to the cooking surface 60. A plurality of lips 52 are provided to secure the grill unit to the firebox.

In operation, the apparatus of the present invention is uniquely adapted to provide an eating experience hereto unavailable with conventional portable grill units found in the home. For instance, most such portable grills contain relatively small food preparation areas affixed to the grill, sufficient only to hold a plate while the food is being cooked. The serving/eating portion 18 of the present invention is adapted to permit guests to sit up to the cooking surface (the griddle) while the food is being prepared, rather than sitting at a remote location. The griddle unit is removeably positioned within the firebox so as to take maximum advantage of the heat produced by the flame unit 14.

Figure 6:
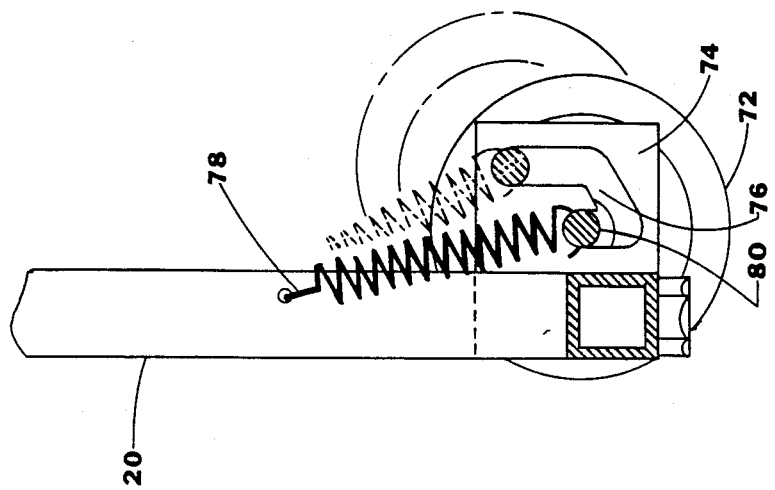
FIG. 6 is a view taken along lines 6—6 of FIG. 3.
Figure 7:
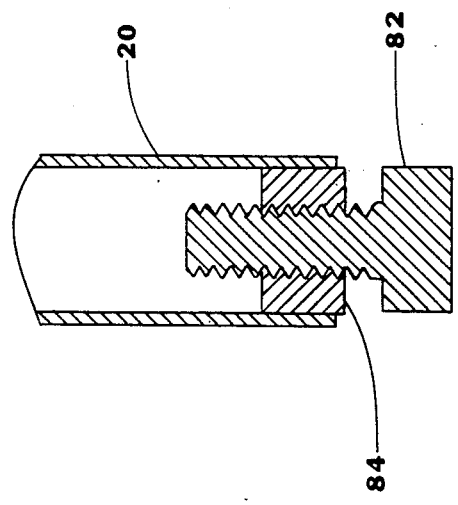
FIG. 7 is a view taken along lines 7—7 of FIG. 2.

At least two of the corners of the frame 20 may be provided with retractable wheels 72. As illustrated in FIG. 6, the wheels 72 may be movably secured to a plate 74 having a J-shaped aperture 76 therein. A spring member 78 secured to frame 20 and an axle 80 maintains the wheel in either an upper (broken lines) unused storage position or a lower use position (solid lines) for movement of the unit. Additionally, all four legs are provided with leveling bolts 82 (FIG. 7) which are screwed into units 84 provided in frame members 20.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

I claim:

1. A portable hydrocarbon gas-fired cooking unit having a firebox, a flame unit, and a cooking surface, the improvement comprising:
    a. the cooking surface in the form of a removable and interchangeable griddle surface and grill unit, the griddle surface and grill unit being of substantially identical dimensions and interfitting with the firebox in substantially identical positions, only one of the griddle surface or grill unit surface being utilized at a time;
    b. a serving/eating portion affixed to the cooking unit and substantially surrounding the firebox, at least a portion of the serving/eating portion being hingedly connected to the cooking unit such that such portion may be folded downwardly for storage;
    c. the cooking surface having a substantially co-planar relationship with an upper edge of the firebox and the serving/eating portion; and
    d. the firebox, flame unit, cooking surface and a hydrocarbon gas source mounted to a wheeled frame.

2. The improvement of claim 1, wherein the serving/eating portion comprises a planar surface having a plurality of wood slats arranged adjacent one another.

3. The improvement of claim 1, wherein the removable grill unit comprises a grill surface within lower housing and an upper housing hingedly connected to the lower housing.

4. The improvement of claim 1, wherein the firebox further comprises a divider dividing the firebox into substantially equal portions such that such portions may be individually controlled with the flame unit.

5. The improvement of claim 1, wherein the unit further comprises retractable wheels movable between a first upper storage position and a second lower use position permitting the unit to be wheeled to a different location.

6. A portable hydrocarbon gas-fired cooking unit having a firebox, a flame unit, and a cooking surface, the improvement comprising:
    a. the cooking surface in the form of a removable and interchangeable griddle surface and grill unit, the griddle surface and grill unit being of substantially identical dimensions and interfitting with the firebox in substantially identical positions, only one of the griddle surface or grill unit surface being utilized at a time;
    b. a serving/eating portion affixed to the cooking unit and substantially surrounding the firebox, at least a portion of the serving/eating portion being hingedly connected to the cooking unit such that such portion may be folded downwardly for storage; and
    c. the cooking surface being contiguous with an upper edge of the firebox; and
    d. the firebox, flame unit, cooking surface and hydrocarbon gas source mounted to a wheeled frame having retractable wheels movable between a first upper storage position and a second lower use position permitting the unit to be wheeled to a different location.

* * * * *